United States Patent
Supplee, Sr.

(10) Patent No.: US 6,537,366 B1
(45) Date of Patent: *Mar. 25, 2003

(54) CONCRETE ADMIXTURE WITH IMPROVED DURABILITY AND EFFLORESCENCE CONTROL CONTAINING A HIGHLY RESILIENT COLORANT

(75) Inventor: William W. Supplee, Sr., Hampton, NJ (US)

(73) Assignee: Color & Chemical Technologies, Inc., Washington, NJ (US)

( * ) Notice: Subject to any disclaimer, the term of this patent is extended or adjusted under 35 U.S.C. 154(b) by 14 days.

This patent is subject to a terminal disclaimer.

(21) Appl. No.: 09/748,424

(22) Filed: Dec. 26, 2000

(51) Int. Cl.$^7$ .......................... C04B 24/00; C04B 26/14; C04B 26/16

(52) U.S. Cl. ................. 106/712; 106/819; 106/822; 106/823; 106/638; 106/713; 106/724; 106/728; 106/810; 524/2; 524/3; 524/4; 524/5; 524/6; 524/7; 524/8; 524/80

(58) Field of Search ................. 106/819, 822, 106/823, 638, 712, 713, 724, 728, 810; 524/23, 4, 5, 6, 7, 8, 80

(56) References Cited

U.S. PATENT DOCUMENTS

| | | | | |
|---|---|---|---|---|
| 3,650,784 A | 3/1972 | Albert et al. | ................ | 106/90 |
| 3,870,777 A | 3/1975 | Jakel | ................ | 264/71 |
| 4,043,826 A | 8/1977 | Hum | ................ | 106/90 |
| 4,152,168 A | 5/1979 | Yano et al. | ................ | 106/99 |
| 4,185,431 A | 1/1980 | Brownlee | ................ | 52/309.17 |
| 4,288,959 A | 9/1981 | Murdock | ................ | 52/518 |
| 4,420,525 A | 12/1983 | Parks | ................ | 428/156 |
| 4,644,719 A | 2/1987 | Salazar | ................ | 52/311 |
| 4,734,136 A | 3/1988 | Burow | ................ | 106/304 |
| 4,956,013 A | 9/1990 | Motoki | ................ | 106/675 |
| 5,248,338 A | 9/1993 | Price | ................ | 106/712 |
| 5,362,322 A | 11/1994 | Johansen, Jr. et al. | ................ | 106/802 |
| 5,395,442 A | 3/1995 | Dunton et al. | ................ | 106/724 |
| 5,558,708 A | * 9/1996 | Johansen et al. | ................ | 106/694 |
| 5,846,315 A | 12/1998 | Johansen, Jr. et al. | ................ | 106/712 |
| 5,922,124 A | * 7/1999 | Supplee | ................ | 106/273.1 |
| 5,951,752 A | 9/1999 | Johansen, Jr. et al. | ................ | 106/712 |
| 6,302,955 B1 | * 10/2001 | Kerkar et al. | ................ | 106/724 |
| RE37,655 E | * 4/2002 | Supplee | ................ | 106/273.1 |

OTHER PUBLICATIONS

American Society For Texting And Materials, Standard Specification for Pigments for Integrally Colored Concrete, 1991 (Reapproved 1986) pp. 1–8 * No Month.

* cited by examiner

Primary Examiner—Elizabeth D. Wood
(74) Attorney, Agent, or Firm—Duane Morris LLP

(57) ABSTRACT

A composition for coloring concrete and methods for making the composition is provided, which includes a hydrophobic efflorescence control agent selected from the group consisting of calcium stearates, zinc stearates, sodium stearates, butyl stearate, stearic acid derivatives, stearic acid salts, and a mixture thereof, a particulated polymer selected from the group consisting of styrene-based polymers and copolymers, acrylic-based polymers and copolymers, polyvinyl acetates, polyepoxides, polyurethanes, butadiene rubbers, and a mixture thereof; and a colorant, wherein the composition improves the durability of the concrete while enhancing the durability and retention of said colorant.

37 Claims, No Drawings

CONCRETE ADMIXTURE WITH IMPROVED DURABILITY AND EFFLORESCENCE CONTROL CONTAINING A HIGHLY RESILIENT COLORANT

BACKGROUND OF THE INVENTION

1. Field of Invention

The present invention relates generally to compositions and methods of preparing compositions for coloring cementitious materials. More particularly, it relates to compositions and methods for preparing compositions using efflorescence control agents, particulated polymers, and a colorant for coloring cementitious materials.

2. Description of Related Art

Concrete is a mixture of fine and coarse aggregates firmly bound into a monolithic mass by a cementing agent. The cement generally used in forming concrete is Portland cement, although other inorganic hydraulic cements are available, which, upon hydration, form relatively insoluble bonded aggregations of considerable strength and dimensional stability. Portland cement consists mainly of tricalcium silicate and dicalcium silicate. The strength of the cementing agent is a function of the water-cement ratio, and therefore strength will vary widely depending upon the amount of water used. To obtain maximum strength, the water-cement ratio should be kept as low as possible. The aggregates are typically sand and crushed stone or gravel, although crushed clay or cinders can also be used in forming concrete. The formation of concrete is a process by which the voids between the particles of the coarse aggregate are filled by the fine aggregate, and the whole is cemented together by the binding action of the cement.

Concrete is an important building material extensively employed in modern construction because of its strength, permanency, and relatively low cost. The long-term success of concrete in meeting any particular set of conditions depends upon the proper correlation of many factors bearing on the selection and mixing of the materials, the placing of the concrete, and the original design.

Research and development in the science of concrete proportioning has advanced significantly in determining the best and most economical mix for a given condition, i.e., where the concrete may be subject to problems, for example, weathering, vibration, freezing, thawing, and other conditions in any selected environment.

One of the problems associated with concrete is efflorescence. Efflorescence is the deposition of calcium carbonate on the surface of masonry units. Deposition takes place as calcium ions in the cement migrate to the surface of a unit and react with atmospheric carbon dioxide, thereby forming calcium carbonate. The appearance and function of a masonry unit which has effloresced is compromised by the reaction. In preventing the reaction, and therefore maintaining the integrity and aesthetic appearance, chemical admixtures are employed in the formulation.

Stearate-containing compounds are used to prevent efflorescence. These stearate compounds are known in the art as efflorescence control agents (ECAs). Although stearate-containing compounds minimize or eliminate efflorescence, they are also known to adversely affect the durability of concrete. Concrete durability is a function of the totality of the polymerization of the cementitious materials in a mix. Because ECAs hinder polymerization, use of ECAs yield a weaker polymer structure and hence a less durable concrete.

Typical ECAs include calcium stearate, zinc stearate, aluminum stearate, among other suitable compounds of stearic acid, salts and derivatives thereof, and mixtures thereof.

Durability of concrete is enhanced by using monomers, polymers, copolymers, and emulsions. Emulsions are generally used for the synthesis of many vinyl and diene polymers and for copolymerization. The polymer produced is in a latex of fine particles, or the latices are coagulated by the addition of chemicals to produce the polymer in a solid form. Typical polymers and copolymers employed include styrene butadiene, polyvinyl acetate, acrylonitrile-butadiene rubber, polyacrylic esters, polyvinylvinylidene, polyvinylidene ester, vinyl chloride, polyethylene-vinyl acetate, polyepoxide, polyurethane, acrylic latex, and mixtures thereof. An example of the use of polymers in concrete is found in U.S. Pat. No. 3,650,784 to Albert which describes a method for improving concrete properties by adding various polymers to fill the pore structure inherent in concrete.

ECAs used in combination with polymers lead to superior concrete properties as described in U.S. Pat. No. 5,922,124 to Supplee, assigned to R&M Chemical Technologies, Inc., the disclosure of which is hereby incorporated by reference as if set forth at length. Improved heat and freeze-thaw durability resulting from reduced efflorescence and stability against ultraviolet light exposure are exemplified in the patent.

The coloring of concrete and other building materials is known. Common concrete colorants are those specified in ASTM C979-86, Standard Specification for Integrally Colored Concrete. The ASTM standards cover the basic requirement for colored and white pigments in powder form to be used as admixtures in concrete for producing integrally colored concrete. The colorants listed in the ASTM specification are generally inorganic pigments which withstand various physical and chemical effects of the intended end use.

The pigments are tested for various properties, including light fastness or resistance to light, alkali resistance, water wettability, atmospheric curing stability, water solubility, and the total sulfates. Inorganic mineral oxides and one specific type of carbon black pigment meet these criteria. Typical pigment types manufactured for coloring concrete include, as set forth in the ASTM standards, synthetic iron oxides, yellows, reds, browns, and black; natural brown iron oxides, chromium oxide green, cobalt blue, and concrete grade carbon black.

U.S. Pat. No. 5,395,442 to Dunton describes a lightweight roof tile with high polymer content, for example, acrylic latex, for adding strength, i.e., durability, with minimally increasing the weight. Organic pigments and inorganic pigments may be used to produce a colored rooftile.

Other patents describe strengthening cementitious veneers, building faces, wall panels, refractory, roofing, and siding articles, and artificial rock by adding polymers. For example, U.S. Pat. No. 4,185,431 to Brownlee employs a polymer emulsion as a wetting agent that is mixed with cement, aggregate, and dry paint pigments for a facing composition. U.S. Pat. No. 4,152,168 to Yano describes a process in which an aqueous colored cement composition containing inorganic particles is applied to the surface of an uncured cement product. U.S. Pat. No. 4,420,525 to Parks describes thin, decorative colored cementitious veneers for walls, floors, and ceilings, and a method of making the veneers. The pigments employed in the colored hydraulic cement mix are natural or inert colors or synthetic materials.

Acrylic polymers are optionally included in the mix. U.S. Pat. No. 4,956,013 to Motoki describes a refractory coating composition that includes a hydraulic cement, a re-emulsion type powdery vinyl resin, aluminum hydroxide powder, a carbonate, and lightweight aggregate. In addition to the five components described, pigments as coloring agents may be contained in the composition. U.S. Pat. No. 4,644,719 to Salazar describes a decorative wall panel that includes a reinforced base layer and a patterned top layer composed of Portland cement, sand, and a pigmented binder. U.S. Pat. No. 5,248,338 to Price describes colored marbled concrete that is prepared with concrete, mortar or tile grout dye. U.S. Pat. No. 4,043,826 to Hum describes a process for making artificial rocks by molding a composition that includes cement, a lightweight filler, water, a curing agent for the cement and an acrylic resin latex, and thereafter nonuniformly coloring the hardened rock with cement dyes or pigments. The latex paint used in the artificial rock composition is based on acrylic resins, to which minor amounts of alkyd resins can be included. The colorant material utilized includes ultramarine blue, carbon black, lamp black, and red, yellow and brown oxides.

U.S. Pat. Nos. 5,558,708, 5,951,752, and 5,846,315 to Johansen, Jr. describe compositions for coloring cement-based compositions such as mortars and grouts. The composition includes a cement-based component and an aqueous pigment component. Additional components include suspension enhancing agents and latex polymer solids, among others. The multi-component coloring systems and methods are described in the patents as not requiring sophisticated measuring devices, as a predetermined amount of an aqueous pigment and a predetermined amount of a cement are provided. The cement component and the pigment component are mixed together to produce a final composition. A pigment component used in the system is described in U.S. Pat. No. 5,362,322.

U.S. Pat. No. 5,362,322 to Johansen uses pigmented resin systems for grouting of ceramic tiles, pavers, and quarry tiles. A first component comprises an epoxy resin and the second component comprises an epoxy hardener. One of the components includes a color pigment additive. Color pigments employed in the system include metal oxides, metal oxide silicates, napthols, chromium oxides, nickel antimony titanium, titanium dioxide, alumino silicate and carbon black. Sophisticated measuring devices are described as unnecessary in providing the multi-component colorant system.

There remains a need for a concrete admixture composition for enhancing the physical properties of concrete, i.e., minimizing efflorescence and increasing durability, which also enhances the durability and retention of a colorant, without requiring sophisticated measuring devices.

SUMMARY OF THE INVENTION

Briefly described, the invention comprises a composition for coloring concrete, including a hydrophobic efflorescence control agent selected from the group consisting of calcium stearates, zinc stearates, sodium stearates, butyl stearate, stearic acid derivatives, stearic acid salts, and a mixture thereof; a particulated polymer selected from the group consisting of styrene-based polymers and copolymers, acrylic-based polymers and copolymers, polyvinyl acetates, polyepoxides, polyurethanes, butadiene rubbers, and a mixture thereof, and a colorant, wherein the composition improves the durability of the concrete while enhancing the durability and retention of said colorant.

In an alternate embodiment, the invention comprises a concrete admixture composition, including about 0.1% by weight to about 85% by weight of a hydrophobic efflorescence control agent; about 0.5% by weight to about 75% by weight of a particulated polymer, said particulated polymer having particle sizes of about 50 angstroms to about 7,000 angstroms; and about 0.001% by weight to about 80% by weight of a colorant in an aqueous dispersion of the total weight of the composition.

The composition also includes a property enhancing additive selected from the group consisting of plasticizers, surfactants, rheology modifiers, biological control agents, and a mixture thereof.

The efflorescence control agent is selected from the group consisting of calcium stearates, zinc stearates, sodium stearates, butyl stearate, stearic acid derivatives, stearic acid salts, tall oil fatty acids, vegetable and animal fats, emulsions based on white grease, silicone compounds, siliconates, and siloxanes, waxes, wax emulsions, soaps and fatty acids, vegetable oils and emulsions, petroleum residues, including mineral oil, paraffin, and bitumens, various pozzolanics, including fly ash, blast furnace slag, diatomaceous earth, inert fillers, including talc, bentonite, and siliceous powders, and a mixture thereof. The particulated polymer is selected from the group consisting of styrene-based polymers and copolymers, acrylic-based polymers and copolymers, polyvinyl acetates, polyepoxides, polyurethanes, butadiene rubbers, and a mixture thereof. The colorant is selected from the group consisting of inorganic mineral oxides, carbon black pigment, organic pigments, high chroma metallic pigments, and a mixture thereof, and can be in dry pigment form, or in a predispersed form.

The method of manufacturing a concrete admixture formulation includes the steps of: formulating a first mixture by preparing a dispersion of a stearate-containing compound, said compound comprising about 0.1% by weight to about 85% by weight; mixing the first mixture until blended; formulating a second mixture by adding a particulated polymer and a plasticizer to the first mixture, said polymer comprising about 0.5% by weight to about 75% by weight, said polymer having particle sizes of about 50 angstroms to about 7,000 angstroms; mixing the second mixture until blended; stabilizing the second mixture with an effective amount of a rheology modifier and an effective amount of a biocide; adding a colorant and mixing until blended, said colorant comprising about 0.001% by weight to about 80% by weight of a colorant in an aqueous dispersion.

The various features and advantages of the present invention may be more readily understood by reference to the following detailed description.

DETAILED DESCRIPTION OF THE PREFERRED EMBODIMENTS

The following detailed description is of the best presently contemplated mode of carrying out the invention. It is not intended in a limiting sense, and is made for the purpose of illustrating the principles of the invention.

Concrete chemical admixtures include any and all substances that are added to concrete batches that are not cement or mineral aggregates. Various chemical admixtures are added to concrete batches to enhance (or to prevent) physical and/or chemical properties and attributes of the mixture.

The present invention comprises a composition for coloring concrete, including a hydrophobic efflorescence control agent selected from the group consisting of calcium stearates, zinc stearates, sodium stearates, butyl stearate, stearic acid derivatives, stearic acid salts, and a mixture thereof, a particulated polymer selected from the group consisting of styrene-based polymers and copolymers, acrylic-based polymers and copolymers, polyvinyl acetates, polyepoxides, polyurethanes, butadiene rubbers, and a mixture thereof, and a colorant, wherein the composition improves the durability of the concrete while enhancing the durability and retention of said colorant.

In an alternate embodiment, the present invention includes a concrete admixture composition that comprises about 0.1% by weight to about 85% by weight of a hydrophobic efflorescence control agent, about 0.5% by weight to about 75% by weight of a particulated polymer, said particulated polymer having particle sizes of about 50 angstroms to about 7,000 angstroms; and about 0.001% by weight to about 80% by weight of a colorant in an aqueous dispersion. It is intended that the phase "by weight" indicates the weight of the total composition.

The efflorescence control agents most commonly used include stearate compounds. Although these compounds are known to be detrimental to the durability of concrete, they are employed to prevent the formation of calcium carbonate on the surface of the masonry unit which is detrimental to the function and adversely affects the appearance of concrete structure. Preferably, the amount of stearate compound used in the present invention comprises between about 0.1 to about 85% by weight. In a more preferred embodiment, the amount of stearate compound employed ranges between about 0.25 to about 70% by weight. In the most preferred embodiment, the amount of stearate compound added to the composition ranges between about 25% to about 45% by weight.

Preferred efflorescence control agents are calcium stearates, zinc stearates, stearic acid and salts thereof, butyl stearates, and sodium stearates. Other efflorescence control agents suitable for use in the present invention include tall oil fatty acids, vegetable and animal fats, emulsions based on white grease, silicone compounds, siliconates, and siloxanes, waxes, wax emulsions, soaps and fatty acids, vegetable oils and emulsions, petroleum residues, including mineral oil, paraffin, and bitumens, various pozzolanics, including fly ash, blast furnace slag, diatomaceous earth, inert fillers, including talc, bentonite, and siliceous powders. The above-noted ECAs are readily available from various vendors. For example, available products include Color Cure from R&M Chemical Technologies, Inc. of Washington, N.J.; Calsan from BASF of Charlotte, N.C., both calcium stearate dispersions. Other products available include butyl stearate from Acros Chemicals of Pittsburgh, Pa., butyl stearate from Witco Chemicals of Houston, Tex., and zinc stearate from Sigma-Aldrich, of St. Louis, Mo. Of these, Calsan from BASF or Color Cure from R&M Chemical Technologies is preferred.

The durability of concrete is the function of the totality of the polymerization of the cementitious materials in the mixture. As discussed above, ECAs hinder polymerization and therefore yield a weaker polymer structure with lower durability. There are, however, compounds that are known to increase durability. Organic polymers, copolymers, emulsions, and monomers increase durability to concrete structures. Preferred polymeric dispersions for use in the present invention include Color Cure XD and Color Cure XDL, a calcium-stearate/styrene acrylic dispersion, available from the R&M Chemical Technologies, Inc., UCAR 820, a latex emulsion, available from Union Carbide of Cary, N.C., and Kelsol 305, a modified polyester dispersion available from Reichhold Chemicals, of Research Triangle Park, N.C.

Polymers preferred for use in the invention also include Wallpol 40152-07, a vinyl acetate polymer, and Kelsol 4097, an acrylic modified polyester, both available from Reichhold Chemicals, Acronal 702 or BASF 400 resin, both styrene modified acrylics available from BASF. In a more preferred embodiment, the resin is styrene butadiene or styrene acrylic from BASF, Union Carbide, or Reichhold. In the most preferred embodiment, styrene acrylic resin from Union Carbide is employed.

The preferred addition rate for the polymeric fraction of the composition is between about 0.5 to about 75% by weight. In a more preferred embodiment, an amount between about 20% to about 70% by weight is used. In the most preferred embodiment, the amount used ranges between about 60% to about 70% by weight. The preferred particle size of the polymer ranges from about 50 angstroms to about 7,000 angstroms.

In combination, the ECA and the polymeric fraction of the composition perform the desired role and lead to superior concrete properties. The superior properties are measured against those units with one or the other component, as set forth in U.S. Pat. No. 5,922,124, assigned to R&M Chemical Technologies, Inc.

It has been discovered that the technology disclosed in U.S. Pat. No. 5,922,124 enhances, protects, and binds colorants into and or onto concrete and other cementitious substances. The scientific theory concerning this phenomenon, although not wishing to be limited thereby, has been developed in the paint and coating systems industry through many years of commercially successful products. The theory is that a monomer, polymer, copolymer, or emulsion form a barrier, film, or encapsulate pigment particles onto and or into a substrate. The protective shield formed of the polymer hinders the effects of atmospheric degradation, known as weathering. Unless pigment particles are protected by a protective shield, the pigments particles are adversely affected by degradation, and are washed-out, removed, or otherwise subjugated.

The preferred amount of colorant employed in one embodiment of the present invention is from about 0.001 to about 80% by weight, more preferred is from about 0.1 to about 25% by weight. In the most preferred embodiment, the colorant content is between about 0.5% to about 20% by weight. Of course, the amount of colorant added to the present composition depends on the color desired and/or the intended end use.

Common concrete colorants preferred for use in the present invention include the common, established, and acceptable colorants set forth in ASTM C979-86, Standard Specification for Integrally Colored Concrete. The common concrete colorants are inorganic mineral oxides, with the exception of one type of carbon black pigment. The acceptability of the pigments for use in concrete structures is based upon scientific evidence of the capability to withstand various physical conditions and chemical reactions. The properties considered include light fastness, alkali resistance, water wetability, atmospheric curing stability, water solubility, and total sulfates. Heretofore, only inorganic mineral oxides and one specific type of carbon black pigment meet these criteria for use in concrete, which herein are referred to as common pigments.

It has advantageously been found that, in addition to the common colorants discussed above, that organic pigments, including all common black pigments, and high chroma metallic pigments can be used in the present invention. These pigments are hereafter referred to as uncommon pigments, as they are not generally used in the concrete industry for coloring concrete for a variety of reasons.

Uncommon pigments useful in the present invention include Zulu Blues, Zulu Greens, Sunglow Yellows, and Citation Reds from Engelhard Corp. Also available from Engelhard Corp. are Aurasperse aqueous dispersions. Additionally, Fanchon yellows, Palomar Greens and Palomar Blues, Indofast violet are available from Bayer Corp. Day-Glo Color Corp. of Cleveland, Ohio, provides the following organic pigments: Aurora Pink, Arc Yellow and Saturn Yellow. A carbon black pigment, LB-1011, is available from Elementis Pigments Inc., of Fairview Heights, Ill. Other useful carbon black pigments include Carbocolor from Cancarb of Alberta, Canada; Hansa Yellows, Permanent Yellows, and Lithol Red from Kingland Chemical Co. of Hangzhou, China; and phthalocyanine blue, phthalocyanine green, Arylide yellows, Quinacridone Orange and Magenta from Sun Chemical Corp. of Fort Lee, N.J. Also available from Sun Chemical is Pigment Black #7.

In a preferred embodiment, the pigments for use in the present invention include Phthalocyanine greens and blues, carbon black dispersions, Arylide yellows and Lithol Reds. In the most preferred embodiment of the invention the following pre-dispersed pigments are used: Aurasperse dispersions from Engelhard and Sunsperse dispersions from Sun Chemical Corp.

When used with the present invention, these uncommon pigments are stabilized in the substrate, the weatherability of a concrete unit including the colorant is increased; the efflorescence is minimized, and the durability is increased. As set forth in the Examples following this description, the color shift is also minimized.

The preferred embodiments for manufacturing the invention are two-fold. One embodiment uses a dry pigment, whereas the other embodiment uses a pre-dispersed pigment. One preferred embodiment using a dry pigment requires additional manufacturing steps discussed below for dispersing the dry pigment into a fluid matrix.

Using the preferred pre-dispersed pigment, a suitable process for manufacturing a composition includes agitating a suspension of stearate salt, acid, or organo-functional form in a solvent, for example, water, to which a dispersant has already been added. After sufficient mixing, plasticizers and polymers are added and either ground or mixed with high-speed dispersion equipment. The dispersion is then stabilized with rheology modifiers and biocides. Into the dispersion a pre-dispersed pigment is added, mixed, and ground to expedite pigment/resin interaction and encapsulation. To avoid additional manufacturing steps involved with dry pigments, the most preferred embodiment uses pre-dispersed pigments.

Dry pigments suitable for use in the present invention can be used by adding a dry pigment to a high-speed disperser to which a dispersant has been added. A preferred dispersant is Curesperse RM, a polyacrylate dispersion, available from R&M Chemical Technologies, Inc. Wetting, grinding and deagglomeration are carried out in subsequent steps. The pigment dispersion is stabilized by the addition of thixotropes and biocides. Preferred thixotropes are cellulosic compounds and a preferred biocide is Proxel, (1,2-benzisothiazolin-3-one) from Avecia of Wilmington, Del. One or more thixotropes and biocides may be used in the present invention, depending upon the intended use of the concrete structure.

In addition to the foregoing, the following additives can be included in the composition: plasticizers, lubricants, dispersants, rheology modifiers, and biological control agents known to those with skill in the art as conventional additives to concrete.

While not wishing to be limited by any scientific theory, the present invention performs and functions synergistically in the particular combinations disclosed, and surprisingly stabilizes and makes useful heretofore unusable uncommon pigments in coloring concrete.

The present invention shall be described in further detail by reference to the following examples which are provided for illustrative purposes only, and are not intended to be limiting. Many modifications and variations are apparent to those skilled in the art, which do not depart from the scope of the claims. Comparative examples are also presented.

EXAMPLE 1

In a suitable manufacturing facility with a Besser Dynapak™ block-making machine three test batches were prepared. The batches were prepared in an industry standard block mix with a fineness modulus (FM) of 3.70. Hollow core concrete blocks were made from the following mix design: 291 lbs. water; 582 lbs. Type I Portland cement; and 6978 lbs. mineral aggregates. The aggregates were divided into three fractions i.e., 32% coarse, 25% fine and 43% sand. All industry standards and manufacturer recommended procedures were followed. Each batch was colored with a black colorant.

The first batch was colored with Bayer 330, a black iron oxide, at a rate of 3½% versus the weight of cement i.e., 20.4 lbs. The second batch was colored with Sun Chemical LHD-9303, a carbon black dispersion, at a rate of 7.75 lbs. The third batch was colored with 19.3 lbs. of the present colorant composition. The second and third batches had the water reduced at a rate compensating for the water in the colorant system to maintain the water/cement ratio constant at 0.50. The colorant system in batch three consisted of 9.65 lbs. water, 3.88 lbs. carbon black pigment, 1.95 lbs. calcium stearate, 3.63 lbs. resin and 0.19 lbs. additives (thixotrope, dispersant and biocide). The pigment loading in the second and third batches was pre-tested to yield equal color value as per photospectrometeric analysis compared to the color value of the first batch.

Six blocks were acquired from each batch and a statistical population of color coordinates was determined. The blocks were exposed to weathering on a south-facing wall for two years and again a statistical population of color coordinates was determined. The data are displayed in Table 1.

TABLE I

CIELAB Color Difference Data for Weathered Blocks versus Control (Unweathered)

| Sample | DL | Da | Db | DE |
| --- | --- | --- | --- | --- |
| Bayer 330 (Unweathered L value = 37.1) | 10.9 | 0.2 | 0.0 | 10.9 |
| LHD-9303 (37.2) | 3.9 | 0.2 | 2.4 | 4.6 |
| Colorant composition (39.3) | 2.8 | 0.2 | 0.5 | 2.9 |

(CIELAB is the acronym for Commission Internationale de I'Eclairage Laboratorie, also known as the International Commission on Illumination)

As can be seen from the data of Table 1, the colorant composition of the present invention retained the greatest amount of pigmentation as signified by the least amount of color shift with the lowest DE value. DE is the root mean square of the entire color difference. The sample batch including the Bayer 330 pigment shifted color at least three times more than the present invention.

EXAMPLE 2

In a suitable concrete manufacturing plant with a Masa 4000VB machine of Masa AG in Andernach, Germany, with a keystone paving stone mold, two test batches were run. Keystone paving stone molds are used in segmental retaining wall systems, and available from Keystone Systems, Inc. of Minneapolis, Minn. A paver (paving stone) mix design with a fineness modulus of 3.22 was used. The machine and raw materials all met industry standards and operated with minimum variation. Both batches were colored blue, one with cobalt blue dry powder pigment and the second with the colorant composition of the present invention. The blue colorant used in the present invention is Phthalocyanine blue, Zulu blue from Engelhard Corporation of Iselin, N.J. The cobalt blue dry pigment was added at a rate of 3% versus the total cement weight in the batch. Zulu blue (0.75%) was added according to the present invention. Differences in the amount of pigment employed in each batch is due to the difference between the tinting strength of the two pigments. The amounts are selected to yield the same color values when the cured pavers are analyzed with a photospectrometer.

Phthalocyanine blue pigment is dispersed into the invention with a high-speed disperser or media mill directly into the resin component. The colorant system of this invention consists of 40% water, 15% pigment, 2% additives, 5% butyl stearate, and 38% resin by weight. After curing 12 pavers from each batch were acquired, measured with a photospectrometer and placed as per industry recommendation for three years in Florida. After three years the pavers were cleaned with efflorescence remover and again read with the photospectrometer. The difference between the initial reading and the weathered reading is displayed in Table II.

TABLE II

CIELAB Color Difference Data for Weathered Pavers versus Control

| Sample | DL | Da | Db | DE |
|---|---|---|---|---|
| Cobalt blue | −4.9 | 3.1 | 4.9 | 7.6 |
| Colorant composition | −4.9 | 0.9 | 1.0 | 5.1 |

As exemplified in the data obtained, the colorant composition of the present invention has the least color shift or change over at least three years.

EXAMPLE 3

The test performed in Example 2 is repeated. In the present example, two batches were made and the pavers were colored with two violet colorants. The first batch was colored with a violet colorant, carbazole violet/pigment violet 23. The second batch was colored with carbazole violet dispersed into the present colorant composition specified in Example 2. The carbazole violet pigment used in both cases is Sun Chemical VHD-6003. After suitable curing, an initial reading of the pavers was taken with a photospectrometer. After weathering for three years, the pavers were cleaned with efflorescence remover and again read with the photospectrometer. The difference between the initial reading and the weathered reading is displayed in Table III.

TABLE III

CIELAB Color Difference Data for Weathered Pavers versus Control

| Sample | DL | Da | Db | DE |
|---|---|---|---|---|
| VHD-6303 | 12.1 | −4.4 | 4.9 | 13.8 |
| Colorant composition | 2.0 | −1.8 | 2.9 | 4.0 |

A marked pigment retention of more than three times is seen from the above data when the colorant composition of the present invention is used.

EXAMPLE 4

Pigmented test batches of concrete were prepared in a suitable extruded concrete Rooftile plant. The test batches consisted of 8% water, 8% styrene acrylic resin, 25% Type I Portland cement, 56% #3 sand lightweight aggregate, and 3% colorant. The two test batches differed by one factor, i.e., Phthalocyanine blue pigment is added in dry form in the first batch and in an aqeuous dispersion in the second batch as per the invention. After curing, photospectrometeric readings were taken. The tiles were placed on a test roof for five years in Florida facing south at a 45° angle. Thereafter, the tiles were again read with a photospectrometer and the differences between the initial and weathered reading were recorded. The data recorded are tabulated below in Table IV.

TABLE IV

CIELAB Color Difference Data for Weathered Pavers versus Control

| Sample | DL | Da | Db | DE |
|---|---|---|---|---|
| Phthalocyanine blue pigment (dry) | 6.2 | 0.7 | 11.8 | 13.3 |
| Colorant composition | 2.0 | −0.4 | 8.1 | 8.4 |

Although the invention has been shown and described in a preferred form with a certain degree of particularity, it is to be understood by those skilled in the art that the present disclosure has been made only by way of example, and that numerous modifications to the method may be made without departing from the spirit and scope of the invention as hereinafter claimed. It is intended that the patent shall cover by suitable expression in the appended claims whatever features of patentable novelty exist in the invention disclosed.

EXAMPLE 5

In a laboratory Hobart Mixer, a concrete mix is prepared containing 1230 grams All-Purpose Sand, 307.5 grams Type I Portland Cement and 147.5 grams water. The components are charged into the mixer and agitated for three minutes. After three minutes the mixing is stopped and 9.2 grams of AC8232F carbazole violet pigment dispersion from Alex Color Company, Ashland, Pa. is added. The mixture is again agitated for three minutes. After three minutes, the mix is removed from the mixer and three 300-gram concrete units are pressed at 12,000 psi on a laboratory Carver Press into a rectangular configuration. The units were cured in a humidity chamber for 24 hours. After 24 hours of ambient curing a statistical population of color reading was taken on the three units. The units were then placed in a sand bed at an exterior location in Washington, N.J.

A second test is prepared similar to the first, but the colorant system of the present invention is substituted. The colorant system of the present invention contains 9.2 grams AC8232F, 2.76 grams CA1115, a tall oil fatty acid from Concord Chemicals, Camden, N.J., and 24.85 grams BASF Acronal S 400 acrylic polymer. The mix water is reduced from 147.5 to 136.8 grams to compensate for the water present in the colorant system. After three minutes of mixing the sand, Portland Cement, and water., the colorant system is added and mixed for three minutes. Three three-hundred gram samples were removed and pressed into rectangular units on a Carver Laboratory Press. The units were humidity cured for 24 hrs and ambient cured for 24 hrs. A statistical population of color measurements were taken among the three units. The units were placed along with the first three in a sand bed at an exterior location in Washington, N.J. After 14 months, the six units were removed from the sand bed, cleaned and a statistical population of color reading was taken. The differences between the weathered and unweathered color is displayed in Table V below. As indicated in Table V, the colorant system of the present invention weathered better than the other sample as signified by the lower DE value.

TABLE V

CIELAB Color Difference Data for Weathered Pavers versus Control

| Sample | DL | Da | Db | DE |
|---|---|---|---|---|
| AC8232F | 4.2 | −0.7 | 9.8 | 10.7 |
| Present Invention | 3.0 | −0.4 | 7.1 | 7.7 |

What is claimed is:

1. A composition for coloring concrete, comprising:
   at least one hydrophobic efflorescence control agent selected from the group consisting of calcium stearates, zinc stearates, sodium stearates, butyl stearate, stearic acid derivatives, and stearic acid salts;
   at least one particulated polymer selected from the group consisting of styrene-based polymers and copolymers, acrylic-based polymers and copolymers, polyvinyl acetates, polyepoxides, polyurethanes, and butadiene rubbers; and
   at least one colorant selected from the group consisting of organic pigments, common black pigments, and high chroma metallic pigments.

2. The composition of claim 1, wherein said composition further comprises: a property enhancing additive selected from the group consisting of plasticizers, surfactants, rheology modifiers, biological control agents, and a mixture thereof.

3. The composition of claim 1, wherein said colorant is a dry pigment.

4. The composition of claim 1, wherein said colorant is pre-dispersed.

5. A concrete admixture composition, comprising:
   about 0.1% by weight to about 85% by weight of a hydrophobic efflorescence control agent;
   about 0.5% by weight to about 75% by weight of a particulated polymer, said particulated polymer having particle sizes of about 50 angstroms to about 7,000 angstroms; and
   about 0.001% by weight to about 80% by weight of at least one colorant selected from the group consisting of organic pigments, common black pigments, and high chroma metallic pigments.

6. The composition of claim 5, wherein said composition further comprises:
   a property enhancing additive selected from the group consisting of plasticizers, surfactants, rheology modifiers, biological control agents, and a mixture thereof.

7. The composition of claim 5, wherein said efflorescence control agent is selected from the group consisting of calcium stearates, zinc stearates, sodium stearates, butyl stearate, stearic acid derivatives, stearic acid salts, tall oil fatty acids, vegetable fats, animal fats, emulsions based on white grease, silicone compounds, siliconates, siloxanes, waxes, wax emulsions, soaps, fatty acids, vegetable oils, vegetable oil emulsions, petroleum residues, mineral oil, paraffin, bitumens, fly ash, blast furnace slag, diatomaceous earth, talc, bentonite, siliceous powders, and a mixture thereof.

8. The composition of claim 5, wherein said particulated polymer is selected from the group consisting of styrene-based polymers and copolymers, acrylic-based polymers and copolymers, polyvinyl acetates, polyepoxides, polyurethanes, butadiene rubbers, and a mixture thereof.

9. The composition of claim 5, wherein the particulated polymer is selected from the group consisting of styrene butadiene, styrene acrylic, polyvinylidine, polyvinylacetate, polyethylene vinyl acetate, polyepoxide, polyurethane, acrylonitrile-butadiene rubber, acrylic latex, polyacrylic ester, vinyl chloride, copolymers thereof, and a mixture thereof.

10. The composition of claim 5, wherein said colorant is a dry pigment.

11. The composition of claim 5, wherein said colorant is pre-dispersed.

12. The composition of claim 11, wherein said colorant comprises 40% water, 15% pigment, 2% additives; 5% butyl stearate, and 38% resin, by weight.

13. The composition of claim 12, wherein the additives include thixotropes, a dispersant, and a biocide.

14. The composition of claim 5, wherein the efflorescence control agent content is about 0.25% by weight to about 70% by weight of the total composition.

15. The composition of claim 14, wherein the polymer content is about 20% by weight to about 70% by weight of the total composition.

16. The composition of claim 15, wherein the colorant content is about 0.1% by weight to about 25% by weight of the total composition.

17. The composition of claim 14, wherein said colorant is a dry pigment.

18. The composition of claim 14, wherein said colorant is pre-dispersed.

19. The composition of claim 18, wherein said colorant comprises 40% water, 15% pigment, 2% additives; 5% butyl stearate, and 38% resin, by weight.

20. The composition of claim 19, wherein the additives include thixotropes, a dispersant, and a biocide.

21. The composition of claim 5, wherein the efflorescence control agent content is 25% by weight to about 45% by weight of the total composition.

22. The composition of claim 21, wherein the polymer content is about 60% by weight to about 70% by weight of the total composition.

23. The composition of claim 22, wherein the colorant content is about 0.5% by weight to about 20% by weight of the total composition.

24. The composition of claim 22, wherein said colorant is a dry pigment.

25. The composition of claim 22, wherein said colorant is pre-dispersed.

26. The composition of claim 25, wherein said colorant comprises 40% water, 15% pigment, 2% additives; 5% butyl stearate, and 38% resin, by weight.

27. The composition of claim 26, wherein the additives include thixotropes, a dispersant, and a biocide.

28. The composition of claim 1, wherein the composition is added to cement.

29. A method of manufacturing a concrete admixture formulation, comprising the steps of:
   formulating a first mixture by preparing a dispersion of an efflorescence control agent compound, wherein the amount of said efflorescence control agent compound is about 0.1% by weight to about 85% by weight of the total weight of the admixture;
   mixing the first mixture until blended;
   formulating a second mixture by adding a particulated polymer and a plasticizer to the first mixture, wherein the amount of said particulated polymer and plasticizer is about 0.5% by weight to about 75% by weight of the total weight of the admixture, said polymer having particle sizes of about 50 angstroms to about 7,000 angstroms;
   mixing the second mixture until blended;
   stabilizing the second mixture with an effective amount of a theology modifier and an effective amount of a biocide;
   adding at least one colorant selected from the group consisting of inorganic mineral oxides, carbon black pigment, organic pigments, and high chroma metallic pigments, and mixing until blended, wherein the amount of said colorant is about 0.001% by weight to about 80% by weight of the total weight of the admixture and wherein said colorant is provided in an aqueaous dispersion.

30. The method of claim 29, wherein said efflorescence control agent compound is selected from the group consisting of calcium stearates, zinc stearates, sodium stearates, butyl stearate, stearic acid derivatives, stearic acid salts, tall oil fatty acids, vegetable fats, animal fats, emulsions based on white grease, silicone compounds, siliconates, siloxanes, waxes, wax emulsions, soaps, vegetable oils, vegetable oil emulsions, petroleum residues, mineral oil, paraffin, bitumens, fly ash, blast furnace slag, diatomaceous earth, talc, bentonite, siliceous powders, and a mixture thereof.

31. The method of claim 29, wherein said particulated polymer is selected from the group consisting of slyrene-based polymers and copolymers, acrylic-based polymers and copolymers, polyvinyl acetates, polyepoxides, polyurethanes, butadiene rubbers, and a mixture thereof.

32. The method of claim 29, wherein the particulated polymer is selected from the group consisting of styrene butadiene, styrene acrylic, polyvinylidine, polyvinylacetate, polyethylene vinyl acetate, polyepoxide, polyurethane, acrylonitrile-butadiene rubber, acrylic latex, polyacrylic ester, vinyl chloride, copolymers thereof, and a mixture thereof.

33. The method of claim 29, wherein said colorant is a dry pigment.

34. The method of claim 29, wherein said colorant is pre-dispersed.

35. The method of claim 34, wherein said colorant comprises 40% water, 15% pigment, 2% additives; 5% butyl stearate, and 38% resin, by weight.

36. The method of claim 35, wherein the additives include thixotropes, a dispersant, and a biocide.

37. The method of claim 29, wherein the composition is added to cement.

* * * * *